(12) United States Patent
Buchanan

(10) Patent No.: US 11,326,673 B2
(45) Date of Patent: May 10, 2022

(54) INCREASED DURABILITY LINEAR ACTUATOR

(71) Applicant: ICON Health & Fitness, Inc., Logan, UT (US)

(72) Inventor: Dale Alan Buchanan, Nibley, UT (US)

(73) Assignee: iFIT Inc., Logan, UT (US)

( * ) Notice: Subject to any disclaimer, the term of this patent is extended or adjusted under 35 U.S.C. 154(b) by 29 days.

(21) Appl. No.: 16/435,104

(22) Filed: Jun. 7, 2019

(65) Prior Publication Data
US 2019/0376585 A1 Dec. 12, 2019

Related U.S. Application Data

(60) Provisional application No. 62/683,331, filed on Jun. 11, 2018.

(51) Int. Cl.
*F16H 25/20* (2006.01)
*A63B 22/02* (2006.01)
*A63B 22/06* (2006.01)

(52) U.S. Cl.
CPC ............. *F16H 25/20* (2013.01); *A63B 22/02* (2013.01); *A63B 22/0605* (2013.01); *A63B 22/0664* (2013.01); *A63B 2225/093* (2013.01); *F16H 2025/2031* (2013.01); *F16H 2025/2037* (2013.01); *F16H 2025/2081* (2013.01)

(58) Field of Classification Search
CPC ............. F16H 25/20; F16H 2025/2031; F16H 2025/2037; F16H 2025/2081; F16H 2025/209; A63B 22/02; A63B 22/0605; A63B 22/0664; A63B 2225/093; A63B 2225/09
See application file for complete search history.

(56) References Cited

U.S. PATENT DOCUMENTS

| | | |
|---|---|---|
| 3,123,646 A | 3/1964 | Easton |
| 3,579,339 A | 5/1971 | Chang |
| 4,023,795 A | 5/1977 | Pauls |
| 4,300,760 A | 11/1981 | Bobroff |
| D286,311 S | 10/1986 | Martinell |
| 4,681,318 A | 7/1987 | Lay |
| 4,684,126 A | 8/1987 | Dalebout |
| 4,728,102 A | 3/1988 | Pauls |
| 4,750,736 A | 6/1988 | Watterson |
| 4,796,881 A | 1/1989 | Watterson |
| 4,813,667 A | 3/1989 | Watterson |
| 4,830,371 A | 5/1989 | Lay |

(Continued)

FOREIGN PATENT DOCUMENTS

| | | |
|---|---|---|
| FR | 2587690 | 3/1987 |
| KR | 200315515 | 6/2003 |
| KR | 20130143215 | 12/2013 |

OTHER PUBLICATIONS

U.S. Appl. No. 29/702,127, filed Sep. 16, 2019, Gordon Cutler.

(Continued)

*Primary Examiner* — Garrett K Atkinson
(74) *Attorney, Agent, or Firm* — Ray Quinney & Nebeker

(57) ABSTRACT

A linear actuator includes a motor, a shaft, and a casing. The shaft has a longitudinal axis, and the shaft is moveable along the longitudinal axis by the motor. The casing supports the motor and the shaft with a tapered roller bearing positioned between at least a portion of the shaft and a portion of the casing.

19 Claims, 8 Drawing Sheets

(56) References Cited

U.S. PATENT DOCUMENTS

| | | |
|---|---|---|
| 4,844,451 A | 7/1989 | Bersonnet |
| 4,850,585 A | 7/1989 | Dalebout |
| D304,849 S | 11/1989 | Watterson |
| 4,880,225 A | 11/1989 | Lucas |
| 4,883,272 A | 11/1989 | Lay |
| D306,468 S | 3/1990 | Watterson |
| D306,891 S | 3/1990 | Watterson |
| 4,913,396 A | 4/1990 | Dalebout et al. |
| D307,614 S | 5/1990 | Bingham |
| D307,615 S | 5/1990 | Bingham |
| 4,921,242 A | 5/1990 | Watterson |
| 4,932,650 A | 6/1990 | Bingham |
| D309,167 S | 7/1990 | Griffin |
| D309,485 S | 7/1990 | Bingham |
| 4,938,478 A | 7/1990 | Lay |
| D310,253 S | 8/1990 | Bersonnet |
| 4,955,599 A | 9/1990 | Bersonnet |
| 4,971,316 A | 11/1990 | Dalebout |
| D313,055 S | 12/1990 | Watterson |
| 4,974,832 A | 12/1990 | Dalebout |
| 4,979,737 A | 12/1990 | Kock |
| 4,981,294 A | 1/1991 | Dalebout |
| D315,765 S | 3/1991 | Measom |
| 4,998,725 A | 3/1991 | Watterson et al. |
| 5,000,442 A | 3/1991 | Dalebout |
| 5,000,443 A | 3/1991 | Dalebout |
| 5,000,444 A | 3/1991 | Dalebout |
| D316,124 S | 4/1991 | Dalebout |
| 5,013,033 A | 5/1991 | Watterson |
| 5,014,980 A | 5/1991 | Bersonnet |
| 5,016,871 A | 5/1991 | Dalebout |
| D318,085 S | 7/1991 | Jacobson |
| D318,086 S | 7/1991 | Bingham |
| D318,699 S | 7/1991 | Jacobson |
| 5,029,801 A | 7/1991 | Dalebout |
| 5,034,576 A | 7/1991 | Dalebout |
| 5,058,881 A | 10/1991 | Measom |
| 5,058,882 A | 10/1991 | Dalebout |
| D321,388 S | 11/1991 | Dalebout |
| 5,062,626 A | 11/1991 | Dalebout |
| 5,062,627 A | 11/1991 | Bingham |
| 5,062,632 A | 11/1991 | Dalebout |
| 5,062,633 A | 11/1991 | Engel |
| 5,067,710 A | 11/1991 | Watterson et al. |
| 5,072,929 A | 12/1991 | Peterson |
| D323,009 S | 1/1992 | Dalebout |
| D323,198 S | 1/1992 | Dalebout |
| D323,199 S | 1/1992 | Dalebout |
| D323,863 S | 2/1992 | Watterson |
| 5,088,729 A | 2/1992 | Dalebout |
| 5,090,694 A | 2/1992 | Pauls |
| 5,102,380 A | 4/1992 | Jacobson |
| 5,104,120 A | 4/1992 | Watterson |
| 5,108,093 A | 4/1992 | Watterson |
| D326,491 S | 5/1992 | Dalebout |
| 5,122,105 A | 6/1992 | Engel |
| 5,135,216 A | 8/1992 | Bingham |
| 5,147,265 A | 9/1992 | Pauls |
| 5,149,084 A | 9/1992 | Dalebout |
| 5,149,312 A | 9/1992 | Croft et al. |
| 5,171,196 A * | 12/1992 | Lynch ............... A63B 21/154 482/54 |
| D332,347 S | 1/1993 | Raadt |
| 5,190,505 A | 3/1993 | Dalebout |
| 5,192,255 A | 3/1993 | Dalebout et al. |
| 5,195,937 A | 3/1993 | Engel |
| 5,203,826 A | 4/1993 | Dalebout |
| D335,511 S | 5/1993 | Engel |
| D335,905 S | 5/1993 | Cutter |
| D336,498 S | 6/1993 | Engel |
| 5,217,487 A | 6/1993 | Engel |
| D337,361 S | 7/1993 | Engel |
| D337,666 S | 7/1993 | Peterson |
| D337,799 S | 7/1993 | Cutter |
| 5,226,866 A | 7/1993 | Engel |
| 5,244,446 A | 9/1993 | Engel |
| 5,247,853 A | 9/1993 | Dalebout |
| 5,259,611 A | 11/1993 | Dalebout |
| D342,106 S | 12/1993 | Campbell |
| 5,279,528 A | 1/1994 | Dalebout et al. |
| D344,112 S | 2/1994 | Smith |
| D344,557 S | 2/1994 | Ashby |
| 5,282,776 A | 2/1994 | Dalebout |
| 5,295,931 A | 3/1994 | Dreibelbis |
| 5,302,161 A | 4/1994 | Loubert |
| D347,251 S | 5/1994 | Dreibelbis |
| 5,316,534 A | 5/1994 | Dalebout |
| D348,493 S | 7/1994 | Ashby |
| D348,494 S | 7/1994 | Ashby |
| 5,328,164 A | 7/1994 | Soga |
| D349,931 S | 8/1994 | Bostic |
| 5,336,142 A | 8/1994 | Dalebout |
| 5,344,376 A | 9/1994 | Bostic |
| D351,202 S | 10/1994 | Bingham |
| D351,435 S | 10/1994 | Peterson |
| D351,633 S | 10/1994 | Bingham |
| D352,534 S | 11/1994 | Dreibelbis |
| D353,422 S | 12/1994 | Bostic |
| 5,372,559 A | 12/1994 | Dalebout et al. |
| 5,374,228 A | 12/1994 | Buisman |
| 5,382,221 A | 1/1995 | Hsu |
| 5,387,168 A | 2/1995 | Bostic |
| 5,393,690 A | 2/1995 | Fu |
| D356,128 S | 3/1995 | Smith |
| 5,409,435 A | 4/1995 | Daniels |
| 5,429,563 A | 7/1995 | Engel |
| 5,431,612 A | 7/1995 | Holden |
| D360,915 S | 8/1995 | Bostic |
| 5,468,205 A | 11/1995 | McFall |
| 5,489,249 A | 2/1996 | Brewer et al. |
| 5,492,517 A | 2/1996 | Bostic |
| D367,689 S | 3/1996 | Wilkinson |
| 5,511,740 A | 4/1996 | Loubert |
| 5,512,025 A | 4/1996 | Dalebout et al. |
| D370,949 S | 6/1996 | Furner |
| D371,176 S | 6/1996 | Furner |
| 5,527,245 A | 6/1996 | Dalebout |
| 5,529,553 A | 6/1996 | Finlayson |
| 5,540,429 A | 7/1996 | Dalebout |
| 5,549,533 A | 8/1996 | Olson |
| 5,554,085 A | 9/1996 | Dalebout |
| 5,569,128 A | 10/1996 | Dalebout |
| 5,591,105 A | 1/1997 | Dalebout |
| 5,591,106 A | 1/1997 | Dalebout |
| 5,595,556 A | 1/1997 | Dalebout et al. |
| 5,607,375 A | 3/1997 | Dalebout |
| 5,611,539 A | 3/1997 | Watterson |
| 5,622,527 A | 4/1997 | Watterson |
| 5,626,538 A | 5/1997 | Dalebout |
| 5,626,542 A | 5/1997 | Dalebout |
| D380,024 S | 6/1997 | Novak |
| 5,637,059 A | 6/1997 | Dalebout |
| D380,509 S | 7/1997 | Wilkinson |
| 5,643,153 A | 7/1997 | Nylen |
| 5,645,509 A | 7/1997 | Brewer et al. |
| D384,118 S | 9/1997 | Deblauw |
| 5,662,557 A | 9/1997 | Watterson et al. |
| 5,669,857 A | 9/1997 | Watterson et al. |
| 5,672,140 A | 9/1997 | Watterson et al. |
| 5,674,156 A | 10/1997 | Watterson et al. |
| 5,674,453 A | 10/1997 | Watterson et al. |
| 5,676,624 A | 10/1997 | Watterson et al. |
| 5,683,331 A | 11/1997 | Dalebout |
| 5,683,332 A | 11/1997 | Watterson et al. |
| 5,689,994 A * | 11/1997 | Nagai ............... B23Q 5/34 74/89.32 |
| D387,825 S | 12/1997 | Fleck |
| 5,695,433 A | 12/1997 | Buisman |
| 5,695,434 A | 12/1997 | Dalebout |
| 5,695,435 A | 12/1997 | Dalebout |
| 5,702,325 A | 12/1997 | Watterson et al. |
| 5,704,879 A | 1/1998 | Watterson et al. |
| 5,718,657 A | 2/1998 | Dalebout et al. |
| 5,720,200 A | 2/1998 | Watterson et al. |

(56) References Cited

U.S. PATENT DOCUMENTS

| | | |
|---|---|---|
| 5,720,698 A | 2/1998 | Dalebout |
| D392,006 S | 3/1998 | Dalebout |
| 5,722,922 A | 3/1998 | Watterson |
| 5,733,229 A | 3/1998 | Dalebout |
| 5,743,833 A | 4/1998 | Watterson et al. |
| 5,762,584 A | 6/1998 | Daniels |
| 5,762,587 A | 6/1998 | Dalebout |
| 5,772,560 A | 6/1998 | Watterson et al. |
| 5,810,698 A | 9/1998 | Hullett |
| 5,827,155 A | 10/1998 | Jensen |
| 5,830,114 A | 11/1998 | Halfen |
| 5,860,893 A | 1/1999 | Watterson et al. |
| 5,860,894 A | 1/1999 | Dalebout et al. |
| 5,899,834 A | 5/1999 | Dalebout et al. |
| D412,953 S | 8/1999 | Armstrong |
| D413,948 S | 9/1999 | Dalebout |
| 5,951,441 A | 9/1999 | Dalebout |
| 5,951,448 A | 9/1999 | Bolland |
| D416,596 S | 11/1999 | Armstrong |
| 6,003,166 A | 12/1999 | Hald |
| 6,019,710 A | 2/2000 | Dalebout |
| 6,027,429 A | 2/2000 | Daniels |
| 6,033,347 A | 3/2000 | Dalebout et al. |
| D425,940 S | 5/2000 | Halfen |
| 6,059,692 A | 5/2000 | Hickman |
| D428,949 S | 8/2000 | Simonson |
| 6,123,646 A | 9/2000 | Colassi |
| 6,171,217 B1 | 1/2001 | Cutler |
| 6,171,219 B1 | 1/2001 | Simonson |
| 6,174,267 B1 | 1/2001 | Dalebout |
| 6,193,631 B1 | 2/2001 | Hickman |
| 6,228,003 B1 | 5/2001 | Hald |
| 6,238,323 B1 | 5/2001 | Simonson |
| 6,250,170 B1 | 6/2001 | Hill |
| 6,251,052 B1 | 6/2001 | Simonson |
| 6,261,022 B1 | 7/2001 | Dalebout et al. |
| 6,280,362 B1 | 8/2001 | Dalebout et al. |
| 6,296,594 B1 | 10/2001 | Simonson |
| D450,872 S | 11/2001 | Dalebout |
| 6,312,363 B1 | 11/2001 | Watterson et al. |
| D452,338 S | 12/2001 | Dalebout |
| D453,543 S | 2/2002 | Cutler |
| D453,948 S | 2/2002 | Cutler |
| 6,350,218 B1 | 2/2002 | Dalebout et al. |
| 6,387,020 B1 | 5/2002 | Simonson |
| 6,413,191 B1 | 7/2002 | Harris |
| 6,422,980 B1 | 7/2002 | Simonson |
| 6,447,424 B1 | 9/2002 | Ashby et al. |
| 6,458,060 B1 | 10/2002 | Watterson et al. |
| 6,458,061 B2 | 10/2002 | Simonson |
| 6,471,622 B1 | 10/2002 | Hammer et al. |
| 6,563,225 B2 | 5/2003 | Soga |
| 6,601,016 B1 | 7/2003 | Brown et al. |
| 6,623,140 B2 | 9/2003 | Watterson |
| 6,626,799 B2 | 9/2003 | Watterson et al. |
| 6,652,424 B2 | 11/2003 | Dalebout |
| 6,685,607 B1 | 2/2004 | Olson |
| 6,695,581 B2 | 2/2004 | Wasson |
| 6,701,271 B2 | 3/2004 | Willner et al. |
| 6,702,719 B1 | 3/2004 | Brown et al. |
| 6,712,740 B2 | 3/2004 | Simonson |
| 6,730,002 B2 | 5/2004 | Hald et al. |
| 6,743,153 B2 | 6/2004 | Watterson et al. |
| 6,746,371 B1 | 6/2004 | Brown et al. |
| 6,749,537 B1 | 6/2004 | Hickman |
| 6,761,667 B1 | 7/2004 | Cutler et al. |
| 6,770,015 B2 | 8/2004 | Simonson |
| 6,786,852 B2 | 9/2004 | Watterson et al. |
| 6,808,472 B1 | 10/2004 | Hickman |
| 6,821,230 B2 | 11/2004 | Dalebout et al. |
| 6,830,540 B2 | 12/2004 | Watterson |
| 6,863,641 B1 | 3/2005 | Brown et al. |
| 6,866,613 B1 | 3/2005 | Brown et al. |
| 6,875,160 B2 | 4/2005 | Watterson |
| D507,311 S | 7/2005 | Butler |
| 6,918,858 B2 | 7/2005 | Watterson et al. |
| 6,921,351 B1 | 7/2005 | Hickman et al. |
| 6,974,404 B1 | 12/2005 | Watterson et al. |
| 6,997,852 B2 | 2/2006 | Watterson et al. |
| 7,025,713 B2 | 4/2006 | Dalebout |
| D520,085 S | 5/2006 | Willardson |
| 7,044,897 B2 | 5/2006 | Myers |
| 7,052,442 B2 | 5/2006 | Watterson |
| 7,060,006 B1 | 6/2006 | Watterson et al. |
| 7,060,008 B2 | 6/2006 | Watterson et al. |
| 7,070,539 B2 | 7/2006 | Brown et al. |
| 7,097,588 B2 | 8/2006 | Watterson |
| D527,776 S | 9/2006 | Willardson |
| 7,112,168 B2 | 9/2006 | Dalebout et al. |
| 7,128,693 B2 | 10/2006 | Brown et al. |
| 7,166,062 B1 | 1/2007 | Watterson et al. |
| 7,166,064 B2 | 1/2007 | Watterson et al. |
| 7,169,087 B2 | 1/2007 | Ercanbrack |
| 7,169,093 B2 | 1/2007 | Simonson |
| 7,192,388 B2 | 3/2007 | Dalebout et al. |
| 7,250,022 B2 | 7/2007 | Dalebout |
| 7,282,016 B2 | 10/2007 | Simonson |
| 7,285,075 B2 | 10/2007 | Cutler et al. |
| 7,344,481 B2 | 3/2008 | Watterson et al. |
| 7,357,758 B2 * | 4/2008 | Polk, III .............. A63B 22/0023 482/54 |
| 7,377,882 B2 | 5/2008 | Watterson |
| 7,425,188 B2 | 9/2008 | Ercanbrack |
| 7,429,236 B2 | 9/2008 | Dalebout |
| 7,455,622 B2 | 11/2008 | Watterson et al. |
| 7,482,050 B2 | 1/2009 | Olson |
| D588,655 S | 3/2009 | Utykanski |
| 7,510,509 B2 | 3/2009 | Hickman |
| 7,537,546 B2 | 5/2009 | Watterson et al. |
| 7,537,549 B2 | 5/2009 | Nelson et al. |
| 7,537,552 B2 | 5/2009 | Dalebout |
| 7,540,828 B2 | 6/2009 | Watterson et al. |
| 7,541,707 B2 * | 6/2009 | Hochhalter ............ F16H 25/20 310/80 |
| 7,549,947 B2 | 6/2009 | Hickman et al. |
| 7,556,590 B2 | 7/2009 | Watterson et al. |
| 7,563,203 B2 | 7/2009 | Dalebout et al. |
| 7,575,536 B1 | 8/2009 | Hickman |
| 7,601,105 B1 | 10/2009 | Gipson, III |
| 7,604,573 B2 | 10/2009 | Dalebout |
| D604,373 S | 11/2009 | Dalebout |
| 7,618,350 B2 | 11/2009 | Dalebout |
| 7,618,357 B2 | 11/2009 | Dalebout |
| 7,625,315 B2 | 12/2009 | Hickman |
| 7,625,321 B2 | 12/2009 | Simonson |
| 7,628,730 B1 | 12/2009 | Watterson et al. |
| 7,628,737 B2 | 12/2009 | Kowallis |
| 7,637,847 B1 | 12/2009 | Hickman |
| 7,645,212 B2 | 1/2010 | Ashby et al. |
| 7,645,213 B2 | 1/2010 | Watterson |
| 7,658,698 B2 | 2/2010 | Pacheco |
| 7,674,205 B2 | 3/2010 | Dalebout |
| 7,713,171 B1 | 5/2010 | Hickman |
| 7,713,172 B2 | 5/2010 | Watterson et al. |
| 7,713,180 B2 | 5/2010 | Wickens |
| 7,717,828 B2 | 5/2010 | Simonson |
| 7,736,279 B2 | 6/2010 | Dalebout |
| 7,740,563 B2 | 6/2010 | Dalebout |
| 7,749,144 B2 | 7/2010 | Hammer |
| 7,766,797 B2 | 8/2010 | Dalebout |
| 7,771,329 B2 | 8/2010 | Dalebout |
| 7,775,940 B2 | 8/2010 | Dalebout |
| 7,789,800 B1 | 9/2010 | Watterson et al. |
| 7,798,946 B2 | 9/2010 | Dalebout |
| 7,815,550 B2 | 10/2010 | Watterson et al. |
| 7,857,731 B2 | 12/2010 | Hickman et al. |
| 7,862,475 B2 | 1/2011 | Watterson |
| 7,862,478 B2 | 1/2011 | Watterson et al. |
| 7,862,483 B2 | 1/2011 | Hendrickson et al. |
| D635,207 S | 3/2011 | Dalebout |
| 7,901,330 B2 | 3/2011 | Dalebout |
| 7,909,740 B2 | 3/2011 | Dalebout |
| 7,980,996 B2 | 7/2011 | Hickman |
| 7,981,000 B2 | 7/2011 | Watterson et al. |

(56) References Cited

U.S. PATENT DOCUMENTS

| | | | |
|---|---|---|---|
| 7,985,164 B2 | 7/2011 | Ashby | |
| 8,029,415 B2 | 10/2011 | Ashby et al. | |
| 8,033,960 B1 | 10/2011 | Dalebout | |
| D650,451 S | 12/2011 | Olson | |
| D652,877 S | 1/2012 | Dalebout | |
| 8,142,370 B2* | 3/2012 | Weinberg | F16F 9/532 601/5 |
| 8,152,702 B2 | 4/2012 | Pacheco | |
| D659,775 S | 5/2012 | Olson | |
| D659,777 S | 5/2012 | Watterson | |
| D660,383 S | 5/2012 | Watterson | |
| D664,613 S | 7/2012 | Dalebout | |
| 8,251,874 B2 | 8/2012 | Ashby et al. | |
| 8,298,123 B2 | 10/2012 | Hickman | |
| 8,298,125 B2 | 10/2012 | Colledge | |
| D671,177 S | 11/2012 | Sip | |
| D671,178 S | 11/2012 | Sip | |
| D673,626 S | 1/2013 | Olson | |
| 8,419,804 B2* | 4/2013 | Herr | A61F 2/72 623/24 |
| 8,690,735 B2 | 4/2014 | Watterson et al. | |
| D707,763 S | 6/2014 | Cutler | |
| 8,740,753 B2 | 6/2014 | Olson | |
| 8,758,201 B2 | 6/2014 | Ashby et al. | |
| 8,771,153 B2 | 7/2014 | Dalebout | |
| 8,784,270 B2 | 7/2014 | Watterson | |
| 8,808,148 B2 | 8/2014 | Watterson | |
| 8,814,762 B2 | 8/2014 | Butler | |
| D712,493 S | 9/2014 | Ercanbrack | |
| 8,840,075 B2 | 9/2014 | Olson | |
| 8,845,493 B2 | 9/2014 | Watterson et al. | |
| 8,870,726 B2 | 10/2014 | Watterson | |
| 8,876,668 B2 | 11/2014 | Hendrickson et al. | |
| 8,894,549 B2 | 11/2014 | Colledge | |
| 8,894,555 B2 | 11/2014 | Olson | |
| 8,900,325 B2* | 12/2014 | Herr | A61F 2/60 623/24 |
| 8,911,330 B2 | 12/2014 | Watterson et al. | |
| 8,920,288 B2 | 12/2014 | Dalebout | |
| 8,955,225 B2* | 2/2015 | Kobayashi | F16H 25/22 29/898.13 |
| 8,986,165 B2 | 3/2015 | Ashby | |
| 8,992,364 B2 | 3/2015 | Law | |
| 8,992,387 B2 | 3/2015 | Watterson et al. | |
| D726,476 S | 4/2015 | Ercanbrack | |
| 9,028,368 B2 | 5/2015 | Ashby et al. | |
| 9,028,370 B2 | 5/2015 | Watterson | |
| 9,039,578 B2 | 5/2015 | Dalebout | |
| D731,011 S | 6/2015 | Buchanan | |
| 9,072,930 B2 | 7/2015 | Ashby et al. | |
| 9,119,983 B2 | 9/2015 | Rhea | |
| 9,123,317 B2 | 9/2015 | Watterson et al. | |
| 9,126,071 B2 | 9/2015 | Smith | |
| 9,126,072 B2 | 9/2015 | Watterson | |
| 9,138,615 B2 | 9/2015 | Olson et al. | |
| 9,142,139 B2 | 9/2015 | Watterson et al. | |
| 9,144,703 B2 | 9/2015 | Dalebout | |
| 9,149,683 B2 | 10/2015 | Watterson et al. | |
| 9,186,535 B2 | 11/2015 | Ercanbrack | |
| 9,186,549 B2 | 11/2015 | Watterson et al. | |
| 9,211,201 B2* | 12/2015 | Herr | A61F 2/72 |
| 9,254,409 B2 | 2/2016 | Dalebout | |
| 9,254,416 B2 | 2/2016 | Ashby | |
| 9,278,248 B2 | 3/2016 | Tyger | |
| 9,278,249 B2 | 3/2016 | Watterson | |
| 9,278,250 B2 | 3/2016 | Buchanan | |
| 9,289,648 B2 | 3/2016 | Watterson | |
| 9,339,691 B2 | 5/2016 | Brammer | |
| 9,351,856 B2* | 5/2016 | Herr | A61F 2/6607 |
| 9,352,185 B2 | 5/2016 | Hendrickson et al. | |
| 9,352,186 B2 | 5/2016 | Watterson | |
| 9,375,605 B2 | 6/2016 | Tyger | |
| 9,381,394 B2 | 7/2016 | Mortensen | |
| 9,387,387 B2 | 7/2016 | Dalebout | |
| 9,393,453 B2 | 7/2016 | Watterson | |
| 9,403,047 B2 | 8/2016 | Olson | |
| 9,403,051 B2 | 8/2016 | Cutler | |
| 9,421,416 B2 | 8/2016 | Mortensen | |
| 9,457,219 B2 | 10/2016 | Smith | |
| 9,457,220 B2 | 10/2016 | Olson | |
| 9,457,222 B2 | 10/2016 | Dalebout | |
| 9,460,632 B2 | 10/2016 | Watterson | |
| 9,463,356 B2 | 10/2016 | Rhea | |
| 9,468,794 B2 | 10/2016 | Barton | |
| 9,468,798 B2 | 10/2016 | Dalebout | |
| 9,480,874 B2 | 11/2016 | Cutler | |
| 9,492,704 B2 | 11/2016 | Mortensen | |
| 9,498,668 B2 | 11/2016 | Smith | |
| 9,517,378 B2 | 12/2016 | Ashby et al. | |
| 9,521,901 B2 | 12/2016 | Dalebout | |
| 9,533,187 B2 | 1/2017 | Dalebout | |
| 9,539,461 B2 | 1/2017 | Ercanbrack | |
| 9,548,637 B2* | 1/2017 | Rapp | H02K 7/116 |
| 9,554,922 B2* | 1/2017 | Casler | G01L 5/0028 |
| 9,579,544 B2 | 2/2017 | Watterson | |
| 9,586,086 B2 | 3/2017 | Dalebout | |
| 9,586,090 B2 | 3/2017 | Watterson et al. | |
| 9,604,099 B2 | 3/2017 | Taylor | |
| 9,616,276 B2 | 4/2017 | Dalebout | |
| 9,616,278 B2 | 4/2017 | Olson | |
| 9,623,281 B2 | 4/2017 | Hendrickson | |
| 9,636,567 B2 | 5/2017 | Brammer et al. | |
| 9,675,839 B2 | 6/2017 | Dalebout | |
| 9,682,307 B2 | 6/2017 | Dalebout | |
| 9,694,234 B2 | 7/2017 | Dalebout et al. | |
| 9,694,242 B2 | 7/2017 | Ashby | |
| 9,737,755 B2 | 8/2017 | Dalebout | |
| 9,757,605 B2 | 9/2017 | Olson | |
| 9,764,186 B2 | 9/2017 | Dalebout | |
| 9,767,785 B2 | 9/2017 | Ashby | |
| 9,795,822 B2 | 10/2017 | Smith | |
| 9,808,672 B2 | 11/2017 | Dalebout | |
| 9,849,326 B2 | 12/2017 | Smith | |
| 9,878,210 B2 | 1/2018 | Watterson | |
| 9,889,334 B2 | 2/2018 | Ashby et al. | |
| 9,889,339 B2 | 2/2018 | Douglass | |
| 9,903,452 B2 | 2/2018 | Tseng | |
| 9,937,376 B2 | 4/2018 | McInelly | |
| 9,937,377 B2 | 4/2018 | McInelly | |
| 9,937,378 B2 | 4/2018 | Dalebout | |
| 9,937,379 B2 | 4/2018 | Mortensen | |
| 9,943,719 B2 | 4/2018 | Smith | |
| 9,943,722 B2 | 4/2018 | Dalebout | |
| 9,948,037 B2 | 4/2018 | Ashby | |
| 9,968,816 B2 | 5/2018 | Olson | |
| 9,968,821 B2 | 5/2018 | Finlayson | |
| 9,968,823 B2 | 5/2018 | Cutler | |
| 10,010,755 B2 | 7/2018 | Watterson | |
| 10,010,756 B2 | 7/2018 | Watterson | |
| 10,029,145 B2 | 7/2018 | Douglass | |
| D826,350 S | 8/2018 | Hochstrasser | |
| 10,046,196 B2 | 8/2018 | Ercanbrack | |
| D827,733 S | 9/2018 | Hochstrasser | |
| 10,065,064 B2 | 9/2018 | Smith | |
| 10,070,974 B2* | 9/2018 | Herr | A61F 2/60 |
| 10,071,285 B2 | 9/2018 | Smith et al. | |
| 10,085,586 B2 | 10/2018 | Smith et al. | |
| 10,086,254 B2 | 10/2018 | Watterson | |
| 10,105,244 B2* | 10/2018 | Herr | G01P 21/00 |
| 10,136,842 B2 | 11/2018 | Ashby | |
| 10,186,161 B2 | 1/2019 | Watterson | |
| 10,188,890 B2 | 1/2019 | Olson | |
| 10,207,143 B2 | 2/2019 | Dalebout | |
| 10,207,145 B2 | 2/2019 | Tyger | |
| 10,207,147 B2 | 2/2019 | Ercanbrack | |
| 10,207,148 B2 | 2/2019 | Powell | |
| 10,212,994 B2 | 2/2019 | Watterson | |
| 10,213,323 B2* | 2/2019 | Casler, Jr. | B25J 9/0006 |
| 10,220,259 B2 | 3/2019 | Brammer | |
| 10,226,396 B2 | 3/2019 | Ashby | |
| 10,226,664 B2 | 3/2019 | Dalebout | |
| 10,252,109 B2 | 4/2019 | Watterson | |
| 10,258,828 B2 | 4/2019 | Dalebout | |
| 10,272,317 B2 | 4/2019 | Watterson | |

(56) References Cited

U.S. PATENT DOCUMENTS

| | | |
|---|---|---|
| 10,279,212 B2 | 5/2019 | Dalebout et al. |
| 10,293,211 B2 | 5/2019 | Watterson |
| D852,292 S | 6/2019 | Cutler |
| 10,343,017 B2 | 7/2019 | Jackson |
| 10,376,736 B2 | 8/2019 | Powell |
| 10,388,183 B2 | 8/2019 | Watterson |
| 10,391,361 B2 | 8/2019 | Watterson |
| D864,320 S | 10/2019 | Weston |
| D864,321 S | 10/2019 | Weston |
| 10,426,989 B2 | 10/2019 | Dalebout |
| 10,433,612 B2 | 10/2019 | Ashby |
| 10,441,840 B2 | 10/2019 | Dalebout |
| 10,449,416 B2 | 10/2019 | Dalebout |
| D868,909 S | 12/2019 | Cutler |
| 10,492,519 B2 | 12/2019 | Capell |
| 10,493,349 B2 | 12/2019 | Watterson |
| 10,500,473 B2 | 12/2019 | Watterson |
| 10,543,395 B2 | 1/2020 | Powell et al. |
| 10,737,764 B2* | 8/2020 | Fox .................. B64C 9/02 |
| 10,968,947 B2* | 4/2021 | Kawai ............. F16C 19/364 |
| 2002/0016235 A1 | 2/2002 | Ashby |
| 2002/0077221 A1 | 6/2002 | Dalebout |
| 2002/0159253 A1 | 10/2002 | Dalebout |
| 2003/0045406 A1 | 3/2003 | Stone |
| 2003/0060331 A1 | 3/2003 | Polk et al. |
| 2004/0091307 A1 | 5/2004 | James |
| 2004/0171464 A1 | 9/2004 | Ashby |
| 2004/0171465 A1 | 9/2004 | Hald |
| 2005/0049123 A1 | 3/2005 | Dalebout |
| 2005/0077805 A1 | 4/2005 | Dalebout |
| 2005/0107229 A1 | 5/2005 | Wickens |
| 2005/0164839 A1 | 7/2005 | Watterson |
| 2005/0253469 A1* | 11/2005 | Hochhalter ........... H02K 11/21 310/80 |
| 2005/0272577 A1 | 12/2005 | Olson |
| 2007/0117683 A1 | 5/2007 | Ercanbrack |
| 2007/0254778 A1 | 11/2007 | Ashby |
| 2008/0051256 A1 | 2/2008 | Ashby |
| 2008/0242520 A1 | 10/2008 | Hubbard |
| 2008/0300110 A1 | 12/2008 | Smith |
| 2009/0105052 A1 | 4/2009 | Dalebout |
| 2009/0261671 A1* | 10/2009 | Hochhalter ........... H02K 11/21 310/80 |
| 2010/0050796 A1* | 3/2010 | Eschborn ............. F16H 25/20 74/89.37 |
| 2010/0113980 A1* | 5/2010 | Herr .................... A61F 2/60 600/587 |
| 2010/0174384 A1* | 7/2010 | Herr .................... A61F 2/70 623/32 |
| 2010/0187051 A1* | 7/2010 | Katayama .......... F16C 33/4605 188/151 R |
| 2010/0242246 A1 | 9/2010 | Dalebout |
| 2012/0237911 A1 | 9/2012 | Watterson |
| 2012/0295774 A1 | 11/2012 | Dalebout |
| 2013/0123083 A1 | 5/2013 | Sip |
| 2013/0165195 A1 | 6/2013 | Watterson |
| 2013/0172152 A1 | 7/2013 | Watterson |
| 2013/0172153 A1 | 7/2013 | Watterson |
| 2013/0178334 A1 | 7/2013 | Brammer |
| 2013/0178768 A1 | 7/2013 | Dalebout |
| 2013/0190136 A1 | 7/2013 | Watterson |
| 2013/0196298 A1 | 8/2013 | Watterson |
| 2013/0196821 A1 | 8/2013 | Watterson et al. |
| 2013/0196822 A1 | 8/2013 | Watterson et al. |
| 2013/0218585 A1 | 8/2013 | Watterson |
| 2013/0244836 A1 | 9/2013 | Maughan |
| 2013/0255418 A1* | 10/2013 | Kobayashi ........... B24C 11/00 74/424.81 |
| 2013/0267383 A1 | 10/2013 | Watterson |
| 2013/0268101 A1 | 10/2013 | Brammer |
| 2013/0274067 A1 | 10/2013 | Watterson |
| 2013/0281241 A1 | 10/2013 | Watterson |
| 2014/0024499 A1 | 1/2014 | Watterson |
| 2014/0073970 A1 | 3/2014 | Ashby |
| 2014/0081421 A1* | 3/2014 | Herr .................... A61F 2/6607 623/25 |
| 2014/0081424 A1* | 3/2014 | Herr .................... H02K 7/06 623/50 |
| 2014/0121071 A1 | 5/2014 | Strom |
| 2014/0135173 A1 | 5/2014 | Watterson |
| 2014/0274574 A1 | 9/2014 | Shorten et al. |
| 2014/0274579 A1 | 9/2014 | Olson |
| 2014/0287884 A1 | 9/2014 | Buchanan |
| 2014/0309085 A1 | 10/2014 | Watterson et al. |
| 2015/0182779 A1 | 7/2015 | Dalebout |
| 2015/0182781 A1 | 7/2015 | Watterson |
| 2015/0238817 A1 | 8/2015 | Watterson |
| 2015/0250418 A1 | 9/2015 | Ashby |
| 2015/0251055 A1 | 9/2015 | Ashby |
| 2015/0253210 A1 | 9/2015 | Ashby et al. |
| 2015/0253735 A1 | 9/2015 | Watterson |
| 2015/0253736 A1 | 9/2015 | Watterson |
| 2015/0258560 A1 | 9/2015 | Ashby |
| 2015/0352396 A1 | 12/2015 | Dalebout |
| 2016/0058335 A1 | 3/2016 | Ashby |
| 2016/0063615 A1 | 3/2016 | Watterson |
| 2016/0092909 A1 | 3/2016 | Watterson |
| 2016/0101311 A1 | 4/2016 | Workman |
| 2016/0107065 A1 | 4/2016 | Brammer |
| 2016/0121074 A1 | 5/2016 | Ashby |
| 2016/0148535 A1 | 5/2016 | Ashby |
| 2016/0148536 A1 | 5/2016 | Ashby |
| 2016/0158595 A1 | 6/2016 | Dalebout |
| 2016/0206922 A1 | 7/2016 | Dalebout et al. |
| 2016/0235557 A1* | 8/2016 | Herr .................... A61H 3/00 |
| 2016/0250519 A1 | 9/2016 | Watterson |
| 2016/0253918 A1 | 9/2016 | Watterson |
| 2016/0296348 A1* | 10/2016 | Herr .................... H02K 7/06 |
| 2016/0346595 A1 | 12/2016 | Dalebout |
| 2017/0036053 A1 | 2/2017 | Smith |
| 2017/0056711 A1 | 3/2017 | Dalebout |
| 2017/0056715 A1 | 3/2017 | Dalebout et al. |
| 2017/0086991 A1* | 3/2017 | Casler .................. A61F 2/70 |
| 2017/0124912 A1 | 5/2017 | Ashby |
| 2017/0193578 A1 | 7/2017 | Watterson |
| 2017/0266483 A1 | 9/2017 | Dalebout et al. |
| 2017/0266489 A1 | 9/2017 | Douglass |
| 2017/0266532 A1 | 9/2017 | Watterson |
| 2017/0266533 A1 | 9/2017 | Dalebout |
| 2017/0270820 A1 | 9/2017 | Ashby |
| 2018/0001135 A1 | 1/2018 | Powell |
| 2018/0036585 A1 | 2/2018 | Powell |
| 2018/0084817 A1 | 3/2018 | Capell et al. |
| 2018/0085630 A1 | 3/2018 | Capell et al. |
| 2018/0089396 A1 | 3/2018 | Capell et al. |
| 2018/0099116 A1 | 4/2018 | Ashby |
| 2018/0099179 A1* | 4/2018 | Chatterton ........ A63B 22/0242 |
| 2018/0099180 A1 | 4/2018 | Wilkinson |
| 2018/0099205 A1 | 4/2018 | Watterson |
| 2018/0104533 A1 | 4/2018 | Powell et al. |
| 2018/0111034 A1 | 4/2018 | Watterson |
| 2018/0117385 A1 | 5/2018 | Watterson et al. |
| 2018/0117393 A1 | 5/2018 | Ercanbrack |
| 2018/0117419 A1 | 5/2018 | Jackson |
| 2018/0154205 A1 | 6/2018 | Watterson |
| 2018/0154207 A1 | 6/2018 | Hochstrasser |
| 2018/0154208 A1 | 6/2018 | Powell et al. |
| 2018/0154209 A1 | 6/2018 | Watterson |
| 2018/0200566 A1 | 7/2018 | Weston |
| 2019/0058370 A1 | 2/2019 | Tinney |
| 2019/0080624 A1 | 3/2019 | Watterson |
| 2019/0117415 A1* | 4/2019 | Herr .................... A61F 2/70 |
| 2019/0151698 A1 | 5/2019 | Olson |
| 2019/0168072 A1 | 6/2019 | Brammer |
| 2019/0178313 A1 | 6/2019 | Wrobel |
| 2019/0192898 A1 | 6/2019 | Dalebout |
| 2019/0192952 A1 | 6/2019 | Powell |
| 2019/0209893 A1 | 7/2019 | Watterson |
| 2019/0223612 A1 | 7/2019 | Watterson |
| 2019/0232112 A1 | 8/2019 | Dalebout |
| 2019/0269958 A1 | 9/2019 | Dalebout |
| 2019/0269971 A1 | 9/2019 | Capell |
| 2019/0275366 A1 | 9/2019 | Powell |

(56) References Cited

U.S. PATENT DOCUMENTS

| | | |
|---|---|---|
| 2019/0282852 A1 | 9/2019 | Dalebout |
| 2019/0315450 A1* | 10/2019 | Fox .......................... B64C 9/02 |
| 2019/0328079 A1 | 10/2019 | Ashby |
| 2019/0329091 A1 | 10/2019 | Powell |
| 2019/0376585 A1 | 12/2019 | Buchanan |
| 2020/0009417 A1 | 1/2020 | Dalebout |
| 2020/0016459 A1 | 1/2020 | Smith |

OTHER PUBLICATIONS

U.S. Appl. No. 13/088,007, filed Apr. 15, 2011, Scott R. Watterson.
U.S. Appl. No. 15/973,176, filed May 7, 2018, Melanie Douglass.
U.S. Appl. No. 16/742,762, filed Jan. 14, 2020, Eric W. Watterson.
U.S. Appl. No. 16/750,925, filed Jan. 25, 2019, Ryan Silcock.
U.S. Appl. No. 16/780,765, filed Feb. 3, 2020, Scott R. Watterson.
U.S. Appl. No. 16/797,850, filed Feb. 11, 2020, Scott R. Watterson.
U.S. Appl. No. 62/852,118, filed May 22, 2019, David Hays.
U.S. Appl. No. 62/887,391, filed Aug. 15, 2019, Gaylen Ercanbrack.
U.S. Appl. No. 62/887,398, filed Aug. 15, 2019, William T. Dalebout.
U.S. Appl. No. 62/897,113, filed Sep. 9, 2019, Megan Jane Ostler.
U.S. Appl. No. 62/914,007, filed Oct. 11, 2019, Jared Willardson.
U.S. Appl. No. 62/934,291, filed Nov. 12, 2019, William T. Dalebout.
U.S. Appl. No. 62/934,297, filed Nov. 12, 2019, William T. Dalebout.
International Search Report issued in PCT application PCT/US2019/036117 dated Oct. 4, 2019.
Office Action and Search Report with English Translation issued in Taiwan patent application 108120057 dated Jan. 22, 2020.
Extended European Search Report for European Application No. 19820425.7, dated Jan. 18, 2022, 9 pages.

* cited by examiner

INCREASED DURABILITY LINEAR ACTUATOR

CROSS-REFERENCE TO RELATED APPLICATIONS

This application claims priority to provisional patent application No. 62/683,331 entitled "INCREASED DURABILITY LINEAR ACTUATOR" filed Jun. 11, 2018, which application is herein incorporated by reference for all that it discloses.

BACKGROUND

Technical Field

This disclosure generally relates to linear actuators. More particularly, this disclosure generally relates to linear actuators used to modify the incline of another platform.

Background and Relevant Art

Conventional linear actuators include a moveable shaft that is supported by thrust bearings. The thrust bearings support the shaft against axial loads when the shaft applies a force to another object. Linear actuators with shafts driven by acme screws have a rotary thrust bearing that allows the acme screw to rotate while the shaft is under an axial compression force.

Sideloading, or the application of a force in a direction perpendicular to the longitudinal axis of the shaft, causes premature failure of the thrust bearing. In linear actuators with acme screw-driven shafts, the failure of the thrust bearing results in a failure of the acme screw and the linear actuator seizing.

Exercise systems, such as treadmills, elliptical machines, and exercise bicycles use linear actuators to adjust the inclination or declination of the system to provide different exercise experiences to users. As users expect greater variety in exercise routines and exercise systems experience more frequent adjustments through an increasingly large range of motion, the linear actuators are exposed to larger amounts of sideloading on the shaft.

SUMMARY

In some embodiments, a linear actuator includes a motor, a shaft, and a casing. The shaft has a longitudinal axis, and the shaft is moveable along the longitudinal axis by the motor. The casing supports the motor and the shaft with a tapered roller bearing positioned between at least a portion of the shaft and a portion of the casing.

In some embodiments, an exercise system includes a base, a frame movably connected to the base, and a linear actuator positioned between at least a portion of the base and at least a portion of the frame to apply a force to the frame and move the frame relative to the base. The linear actuator includes a motor, a shaft, and a casing. The shaft has a longitudinal axis, and the shaft is moveable along the longitudinal axis by the motor. The casing supports the motor and the shaft with a tapered roller bearing positioned between at least a portion of the shaft and a portion of the casing.

In some embodiments, a method of supporting a shaft of a linear actuator includes receiving a radial force with a shaft of the linear actuator, transmitting the radial force to an acme screw, and applying a torque with the acme screw to a tapered roller bearing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 is a side cross-sectional view of a linear actuator, according to at least one embodiment of the present disclosure;

FIG. 3-2 is a side cross-sectional view of another linear actuator, according to at least one embodiment of the present disclosure;

FIG. 4-1 is a side cross-sectional view of a linear actuator supporting an exercise platform in a retracted state, according to at least one embodiment of the present disclosure;

FIG. 4-2 is a side cross-sectional view of a linear actuator supporting an exercise platform in an extended state, according to at least one embodiment of the present disclosure;

DETAILED DESCRIPTION

In some embodiments of a linear actuator according to the present disclosure, an actuator may include a tapered roller bearing supporting a shaft to reinforce the shaft against sideloading. For example, a conventional linear actuator has a bushing positioned at a base of a shaft to support the shaft against axial loads applied to the shaft. The bushing or other axial bearings may provide axial support but may wear prematurely when the linear actuator is exposed to lateral forces applied to the shaft.

Figure 1:
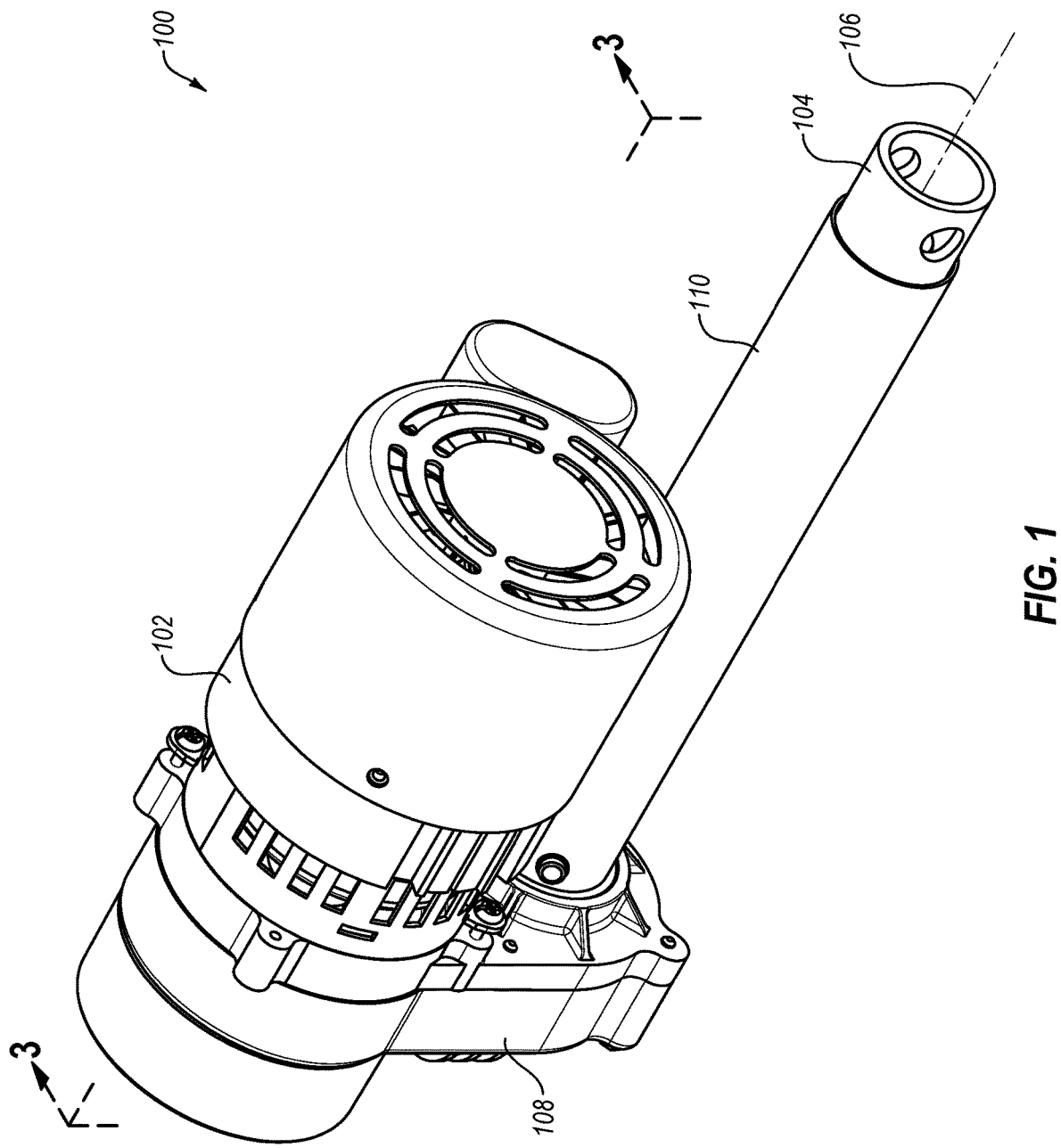
FIG. 1 is a perspective view of a linear actuator, according to at least one embodiment of the present disclosure.

FIG. 1 is a perspective view of a linear actuator 100, according to the present disclosure. The linear actuator 100 includes a motor 102 configured to move a shaft 104 axially along a longitudinal axis 106 of the shaft 104. The motor 102 is connected to the shaft 104 through a casing 108 and a sleeve 110. The casing 108 may contain one or more gears, belts, cables, or other torque transmission devices to transfer torque from the motor 102 to an acme screw in the sleeve 110. The acme screw may interact with a complementary surface feature on the shaft 104 such that, upon rotation of the acme screw, the shaft 104 moves in the direction of the longitudinal axis 106.

Figure 2:
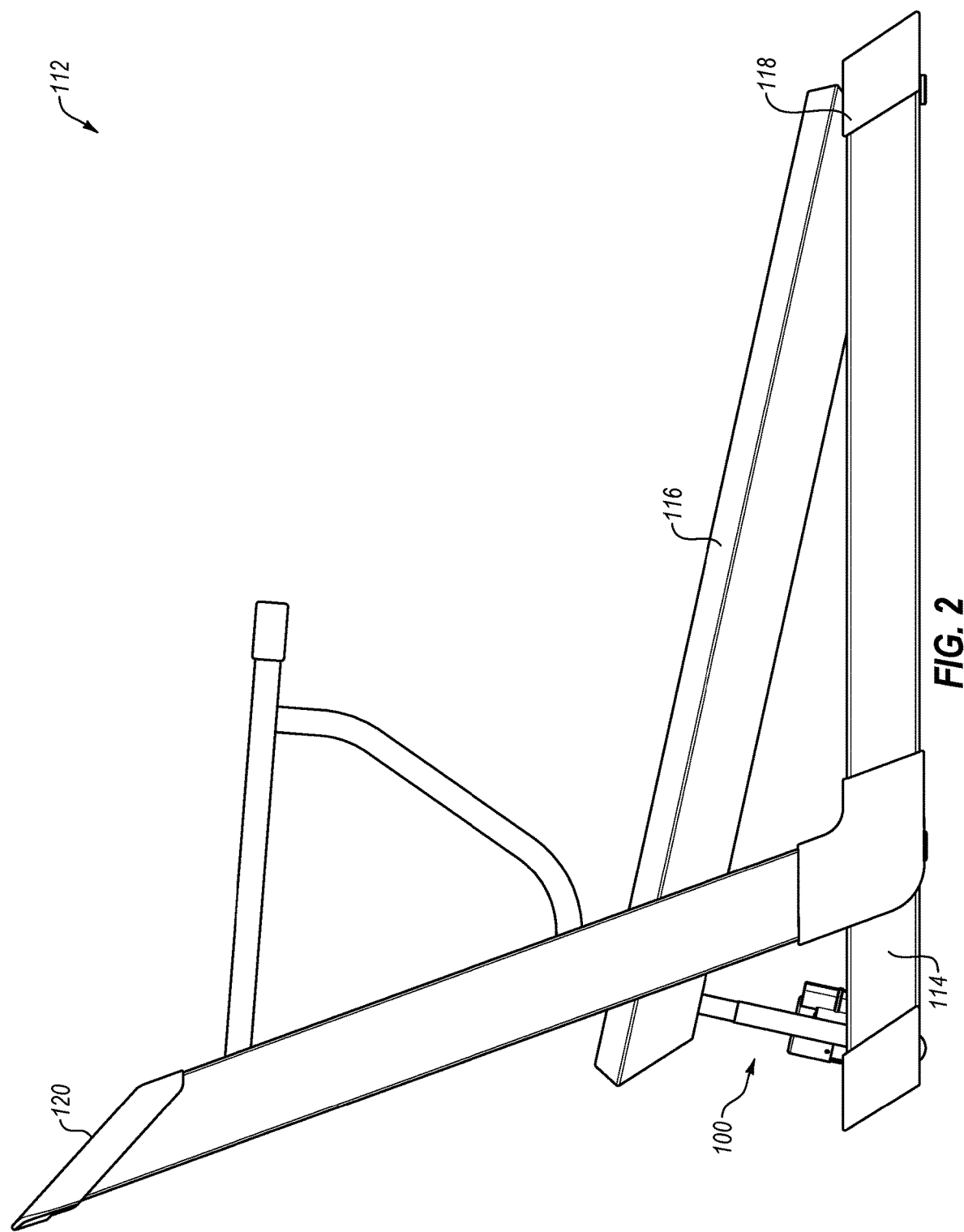
FIG. 2 is a side view of an exercise system, according to at least one embodiment of the present disclosure.

FIG. 2 illustrates an exercise system 112 including the linear actuator 100 of FIG. 1. The exercise system 112 may include a base 114 and a frame 116 that are movably connected to one another. The linear actuator 100 may be oriented at any orientation to push, pull, or apply a force to the frame 116 through a mechanical linkage. The base 114 and frame 116 may be pivotally connected to one another about a hinge 118. In some embodiments, the linear actuator 100 may be positioned between at least a portion of the base 114 and a portion of the frame 116 to apply a force between the base 114 and the frame 116 to change an inclination (or declination) of the frame 116 relative to the base 114. In some embodiments, the base 114 and frame 116 may have a range of motion having a lower value of 0°, −5°, −10°, −15°, or less, and the range of motion of the base 114 and frame 116 may have an upper value of 5°, 10°, 15°, 20°, 25°, or more. For example, the base 114 and frame 116 may have a range of motion at least from 0° to 5°. In other examples, the base 114 and frame 116 may have a range of motion at least from −5° to 15°. In yet other examples, the base 114 and frame 116 may have a range of motion at least from −10° to 20°. In further examples, the base 114 and frame 116 may have a range of motion at least from −15° to 25°. In yet further examples, the base 114 and frame 116 may have a range of motion at least −20° to 25°.

In some embodiments, the exercise system 112 may include one or more computing devices 120 or other interfaces through which a user may interact with the exercise system 112. The computing device 120 is in communication with the linear actuator 100. For example, the computing device 120 may allow the user to control the movement of the frame 116 relative to the base 114 by manual selection of an inclination or declination value through the computing device 120. In other examples, the computing device 120 may contain stored thereon one or more exercise routines that includes one or more inclination or declination values of the frame 116 relative to the base 114 therein. An exercise routine may cause the computing device 120 to communicate with the linear actuator 100 to move the frame 116 relative to the base 114 and change the inclination or declination of the frame 116 to provide a variety of exercise experiences for a user.

In some embodiments, the computing device 120 may communicate with or access user profiles with exercise routines specific to the selected user. An example of a user profile database that may be compatible with the principles described herein includes an iFit program available through www.ifit.com and administered through ICON Health and Fitness, Inc. located in Logan, Utah, U.S.A. In some examples, the user information accessible through the user profiles includes the user's age, gender, body composition, height, weight, health conditions, other types of information, or combinations thereof that may be helpful in determining the appropriate exercise routine for the user. Such user profile information may be available to the computing device 120 through the iFit.

Figures 1, 3:
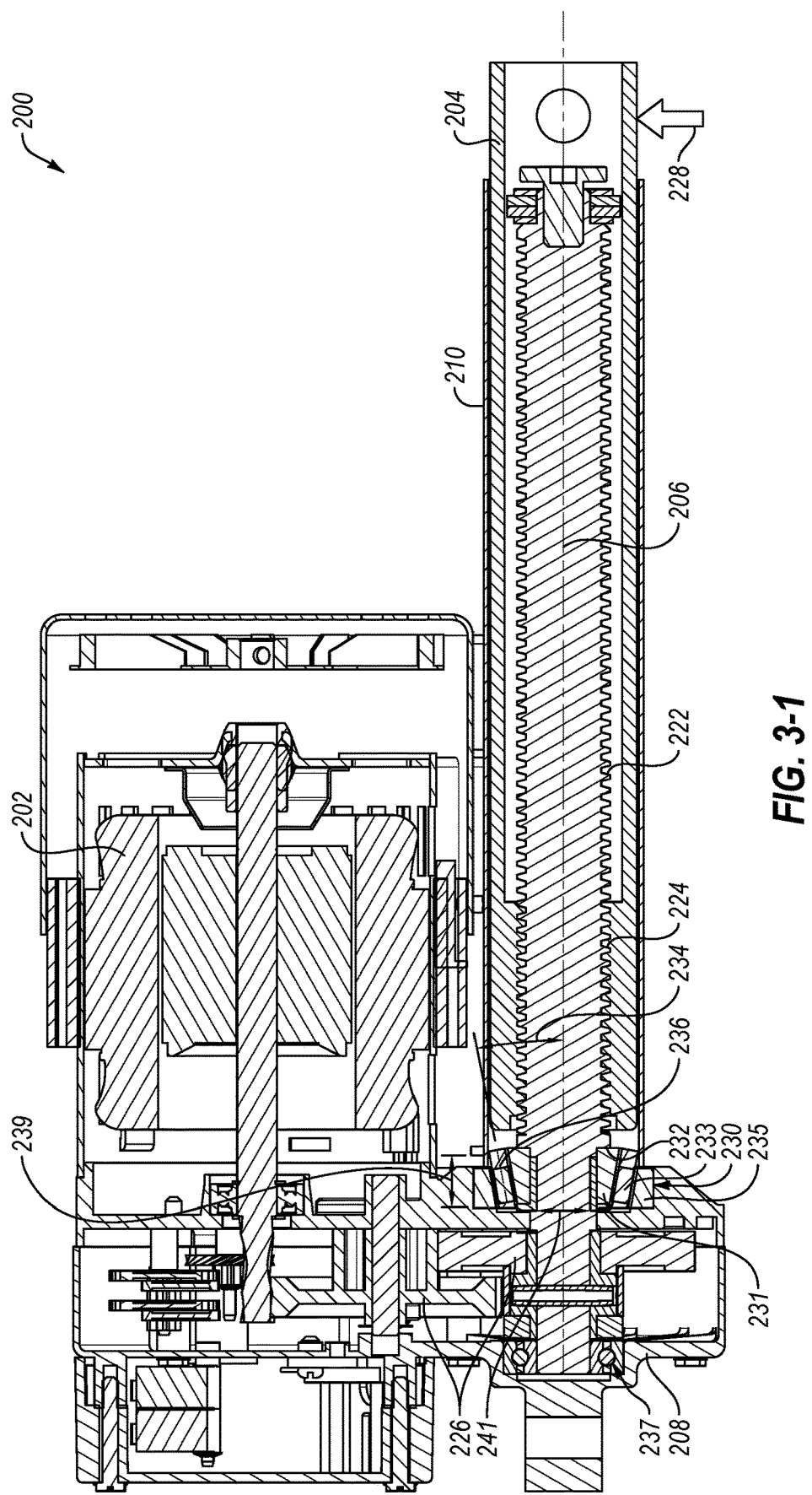
Figures 2, 3:
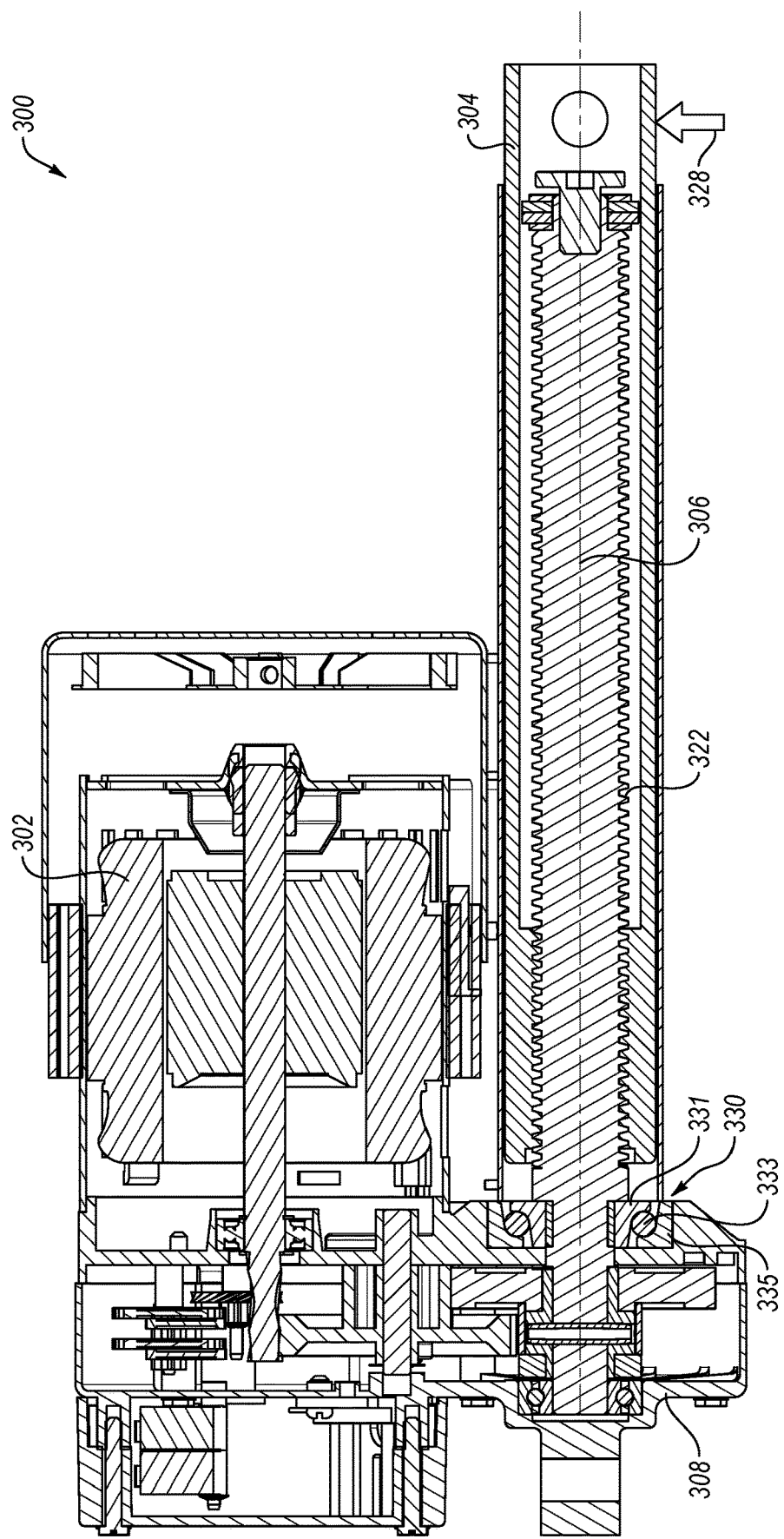

FIG. 3-1 illustrates a side cross-sectional view of the embodiment of a linear actuator 200, according to the present disclosure. The linear actuator 200 includes a motor 202 configured to move the shaft 204 along the longitudinal axis 206 with an acme screw 222. The acme screw 222 may interact with a complementary interface 224 between the acme screw 222 and the shaft 204 such that when the acme screw 222 rotates about the longitudinal axis 206, the threaded complementary interface 224 urges the shaft axially along the longitudinal axis 206 and relative to the sleeve 210. While the complimentary interface 224 is shown as integral to the shaft 204, in other embodiments, the complimentary interface 224 may be positioned on a nut or other intermediate component that is axially fixed relative to the shaft 204. The acme screw 222 is driven by a linkage of gears 226 positioned within the casing 208 driven by the motor 202. In other embodiments, the linkage from the motor 202 to the acme screw 222 may include belts, chains, cams, levers, or other mechanisms for transferring torque from the motor 202 to the acme screw 222.

The acme screw 222 prevents back driving of the linear actuator 200 during use. In particular, an exercise system, such as the exercise system 112 described in relation to FIG. 2, may experience repeated impacts during use that may back drive a ball screw.

In some embodiments, such as the exercise system 112 described in relation to FIG. 2, the shaft 204 may experience a force 228 applied in a radial direction perpendicular to the longitudinal axis 206. A torque applied to the shaft 204 by the force 228 may be transmitted to the acme screw 222 and to the connection of the acme screw 222 to the casing 208 and/or the gears 226. For example, the force 228 may be incurred from the lateral impact of a user running on a treadmill on an exercise system (such as on the frame 116 of FIG. 2). In other examples, the force 228 may be incurred from a downward force applied by the weight of a user and/or a frame resting on the linear actuator 200 when an exercise system is positioned with an inclination or declination.

A linear actuator 200 includes a tapered roller bearing 230 positioned between the shaft 204 and the casing 208. In some embodiments, the tapered roller bearing 230 may be positioned between at least a portion of the acme screw 222 and the casing 208. For example, the tapered roller bearing 230 may be positioned between a shoulder 232 of the acme screw 222 and the casing 208. The radial force 228 and/or an axial force on the shaft 204 may be transmitted to the acme screw 222 and to the tapered roller bearing 230. The tapered roller bearing 230 includes an inner race 231, an outer race 235, and a plurality of rollers 233 positioned between the inner race 231 and outer race 235.

In some embodiments, the tapered roller bearing 230 may have a bearing angle 234 between the longitudinal axis 206 and a bearing axis 236 of the tapered roller bearing 230. The bearing angle 234 may be in a range having an upper value, a lower value, or upper and lower values including any of 5°, 10°, 15°, 20°, 25°, 30°, 35°, 40°, 45°, or any values therebetween. In some examples, the bearing angle 234 may be greater than 5°. In other examples, the bearing angle 234 may be less than 45°. In yet other examples, the bearing angle 234 may be between 5° and 45°. In further examples, the bearing angle 234 may be between 5° and 30°. In yet further examples, the bearing angle 234 may be about 10°. The bearing angle 234 of the tapered roller bearing 230 may affect the operational lifetime of the linear actuator 200 by being oriented to receive more radial force 228 relative to axial force on the acme screw 222 or more axial force relative to radial force 228.

The linear actuator 200 may include a second bearing positioned longitudinally beyond the tapered roller bearing 230 relative to the shaft 204. For example, FIG. 3-1 illustrates a roller ball bearing 237 positioned at a terminal end of the acme screw 222 past the gears 226. The roller ball bearing 237 may provide additional support to the acme screw 222 when the shaft 206 experiences sideloading. In other examples, the tapered roller bearing 230 and the roller ball bearing 237 may be interchanged, with the roller ball bearing 237 adjacent the shoulder 232 of the acme screw 222.

In some embodiments, the tapered roller bearing 230 is capable of supporting an axial load in a range having an upper value, a lower value, or upper and lower values including any of 500 pounds, 750 pounds, 1000 pounds, 1250 pounds, 1500 pounds, 1750 pounds, 2000 pounds, or any values therebetween. For example, at least 500 pounds of axial force (i.e., in the direction of the longitudinal axis 206). In other embodiments, the tapered roller bearing 230 is capable of supporting between 700 pounds and 2000 pounds of axial force. In other embodiments, the tapered roller bearing 230 is capable of supporting between 1000 pounds and 2000 pounds of axial force. In other embodiments, the tapered roller bearing 230 is capable of supporting at between 1500 pounds and 2000 pounds of axial force. In other embodiments, the tapered roller bearing 230 is capable of supporting about 2000 pounds of axial force.

In some embodiments, the tapered roller bearing 230 has an inner diameter 239 that is less than 1.5 inches. In other embodiments, the tapered roller bearing 230 has an inner diameter 239 that is less than 1.25 inches. In yet other embodiments, the tapered roller bearing 230 has an inner diameter 239 that is less than 1.0 inches. In further embodiments, the tapered roller bearing 230 has an inner diameter 239 that is less than 0.75 inches. In yet further embodiments, the tapered roller bearing 230 has an inner diameter 239 that is less than 0.5 inches.

In some embodiments, the tapered roller bearing 230 has a length 241 in the longitudinal direction (i.e., the direction of longitudinal axis 206) that is less than 1.0 inches. In other embodiments, the tapered roller bearing 230 has a length 241 that is less than 0.9 inches. In yet other embodiments, the tapered roller bearing 230 has a length 241 that is less than 0.8 inches. In further embodiments, the tapered roller bearing 230 has a length 241 that is less than 0.7 inches. In yet further embodiments, the tapered roller bearing 230 has a length 241 that is less than 0.6 inches. In at least one embodiment, the tapered roller bearing 230 has a length 241 that is less than 0.5 inches.

FIG. 3-2 illustrates a side cross-sectional view of another embodiment of a linear actuator 300, according to the present disclosure. The linear actuator 300 includes a motor 302 configured to move the shaft 304 along the longitudinal axis 306 with an acme screw 322. While embodiments of linear actuators described herein may be described in relation to a tapered roller bearing, in other embodiments, a linear actuator 300 includes an angular contact roller bearing 330 positioned between the shaft 304 and the casing 308. The angular contact roller bearing 330 includes a curved inner race 331, a curved outer race 335, and a plurality of ball bearings 333 positioned between the inner race 331 and outer race 335.

In some embodiments, the angular contact roller bearing 330 may be positioned between at least a portion of the acme screw 322 and the casing 308. For example, the angular contact roller bearing 330 may be positioned between a shoulder 332 of the acme screw 322 and the casing 308. The radial force 328 and/or an axial force on the shaft 304 may be transmitted to the acme screw 322 and to the angular contact roller bearing 330.

Figures 1, 4:
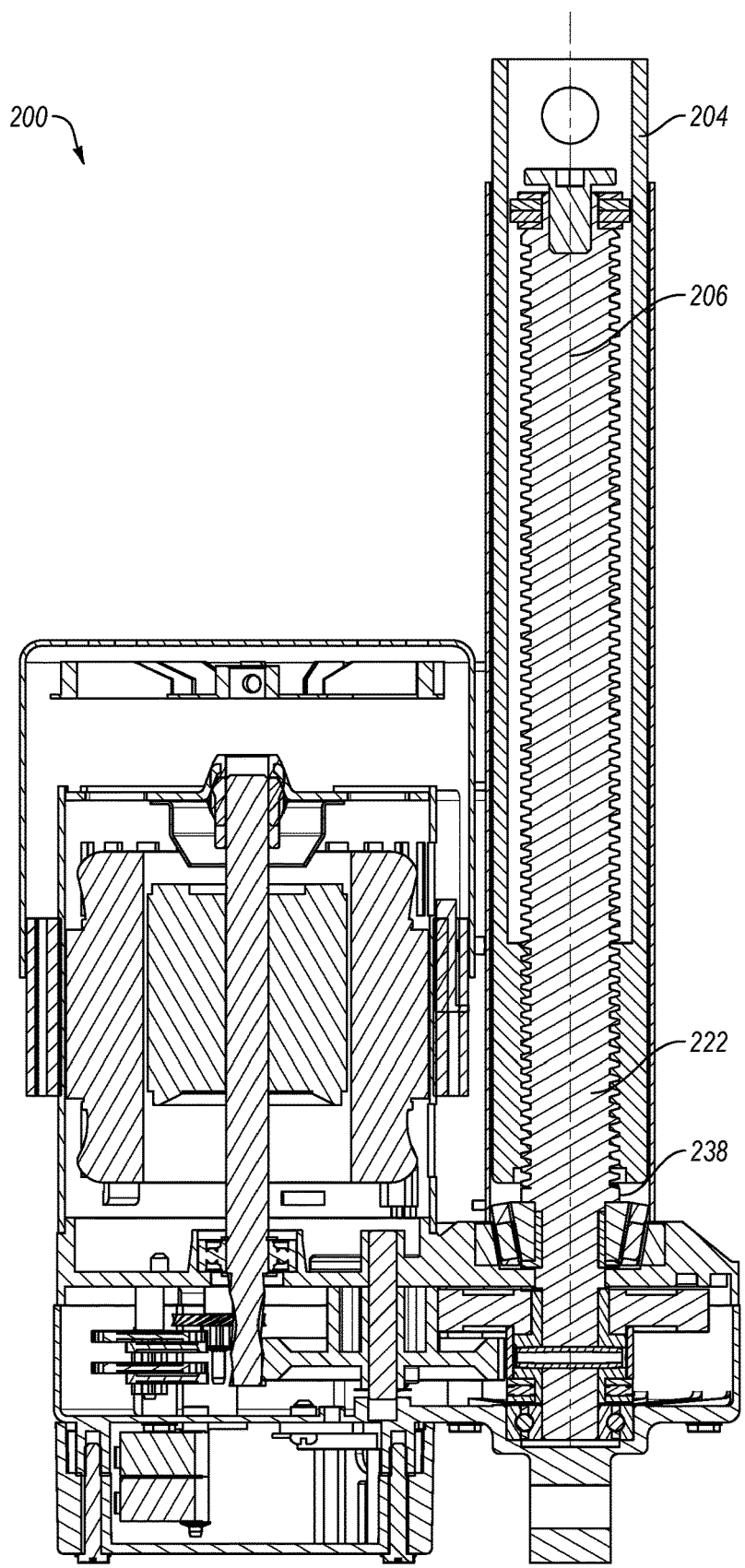
Figures 2, 4:
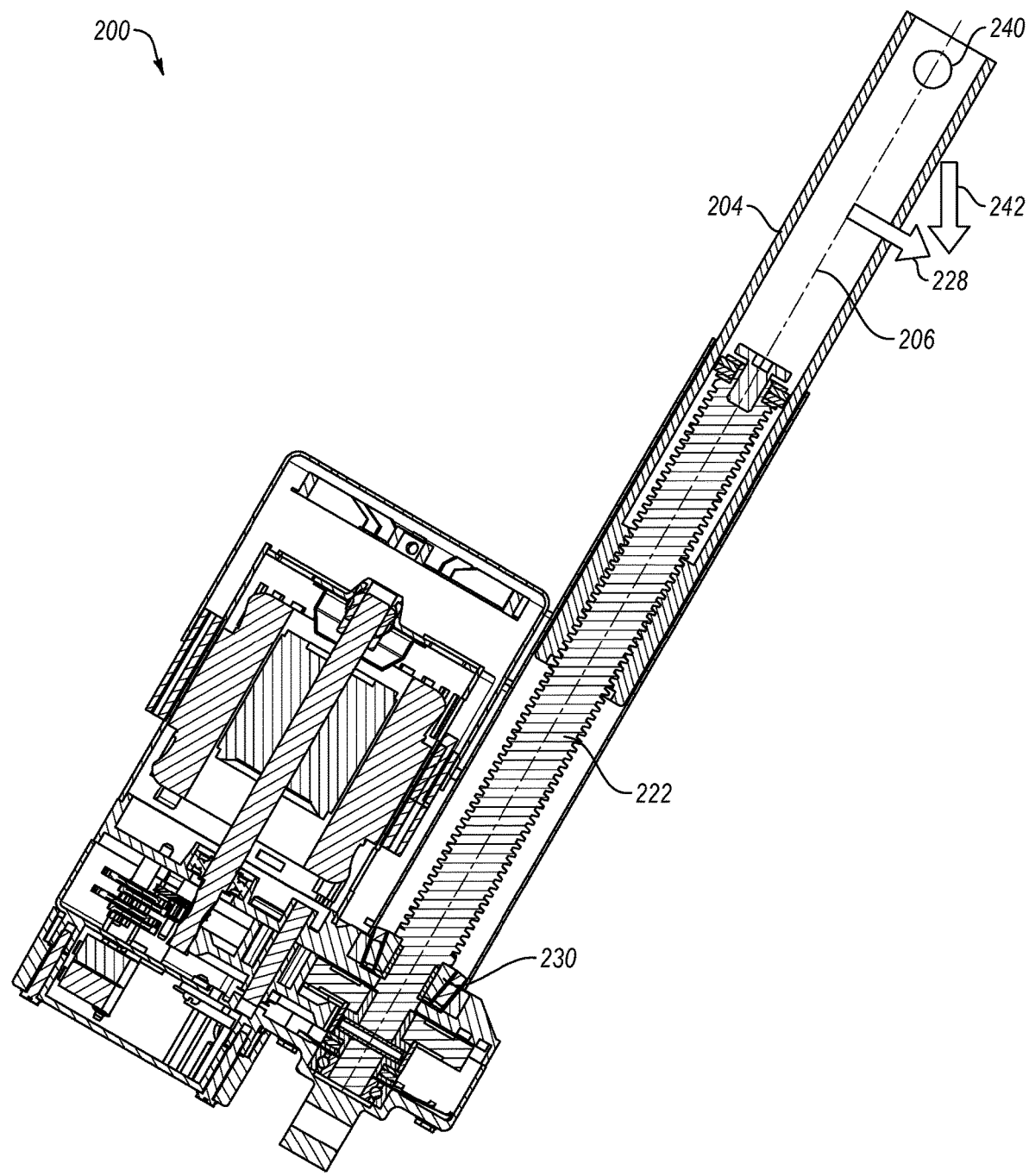

FIGS. 4-1 and 4-2 illustrate an example of the linear actuator 200 moving from a retracted state in FIG. 4-1 to an extended state in FIG. 4-2, and the associated radial force 228 that may be applied to the shaft 204. FIG. 4-1 is a side cross-sectional view of the linear actuator 200 in a vertical position and in a retracted state. During movement of a frame of an exercise system, a linear actuator 200 may apply an axial extension force to move a portion of the frame further from a portion of the base. In the retracted state, the linear actuator 200 may have a portion of the shaft 204 at or near a first end 238 of the acme screw 222. The longitudinal axis 206 of the shaft 204 may be approximately in the direction of gravity. For example, the shaft 204 may be approximately vertical. In such embodiments, the weight of the frame or of a user of the exercise system may apply an axial force in the direction of the longitudinal axis 206 only.

FIG. 4-2 illustrates an example of the linear actuator 200 in an extended state. In exercise systems with a hinged connection between a base and a frame (such as described in relation to FIG. 2), the linear actuator 200 may change orientation when moving the linear actuator 200 between the retracted state and the extended state. For example, the arcuate movement of a hinged frame and base may cause the linear actuator 200 to tilt in orientation as the frame increases inclination relative to the base. In other words, the longitudinal axis 206 of the linear actuator 200 may form a non-zero angle to the direction of gravity. In some embodiments, the longitudinal axis 206 may be oriented at a 2°, 5°, 10°, 15°, 20°, 25°, or 30° orientation to gravity. As the orientation to gravity increases, the potential for radial force 228 to be applied to the shaft 204 increases.

A frame may connect to and/or apply a force to a connection point 240 of the shaft 204. The downward force 242 may have a radial force 228 component. The downward force 242 may include the gravitational weight of the frame, the gravitational weight of a user, any downward force applied by a user (for example, during running on the treadmill), or combinations thereof. In some embodiments, the shaft 204 may experience a further radial force 228 due to lateral forces applied to the frame by a user (for example, during running on the treadmill). Further, in an extended state such as illustrated in FIG. 4-2, the shaft 204 may act as an extended lever, increasing the amount of torque applied to the acme screw 222 by the radial force 228.

Conventional linear actuators are used in axial applications, only. A tapered roller bearing 230 may allow the shaft 204 and acme screw 222 to receive a non-axial force (i.e., the radial force 228) without premature wear on thrust bearings or other components of the linear actuator. The radial force 228 may apply a torque to the shaft 204 and/or acme screw 222 that is received by and counteracted by the tapered roller bearing 230 allowing one or more embodiments of a linear actuator 200 according to present disclosure to be used in non-axial applications without redesigning the surrounding system, without using a different type of actuator, or without premature failure of the device, reducing design, manufacturing, maintenance, and repair costs of the linear actuator and/or a system in which the linear actuator is used.

At least one embodiment of a linear actuator according to the present disclosure may further increase a durability of the linear actuator by reducing the force generated by the linear actuator moving from the extended state to the retracted state. For example, the linear actuator may produce a greater extension force than retraction force to limit the heat generated by the linear actuator, thereby limiting the thermal damage to the linear actuator during high duty cycles (such as greater than 50% duty cycles).

Figure 5:
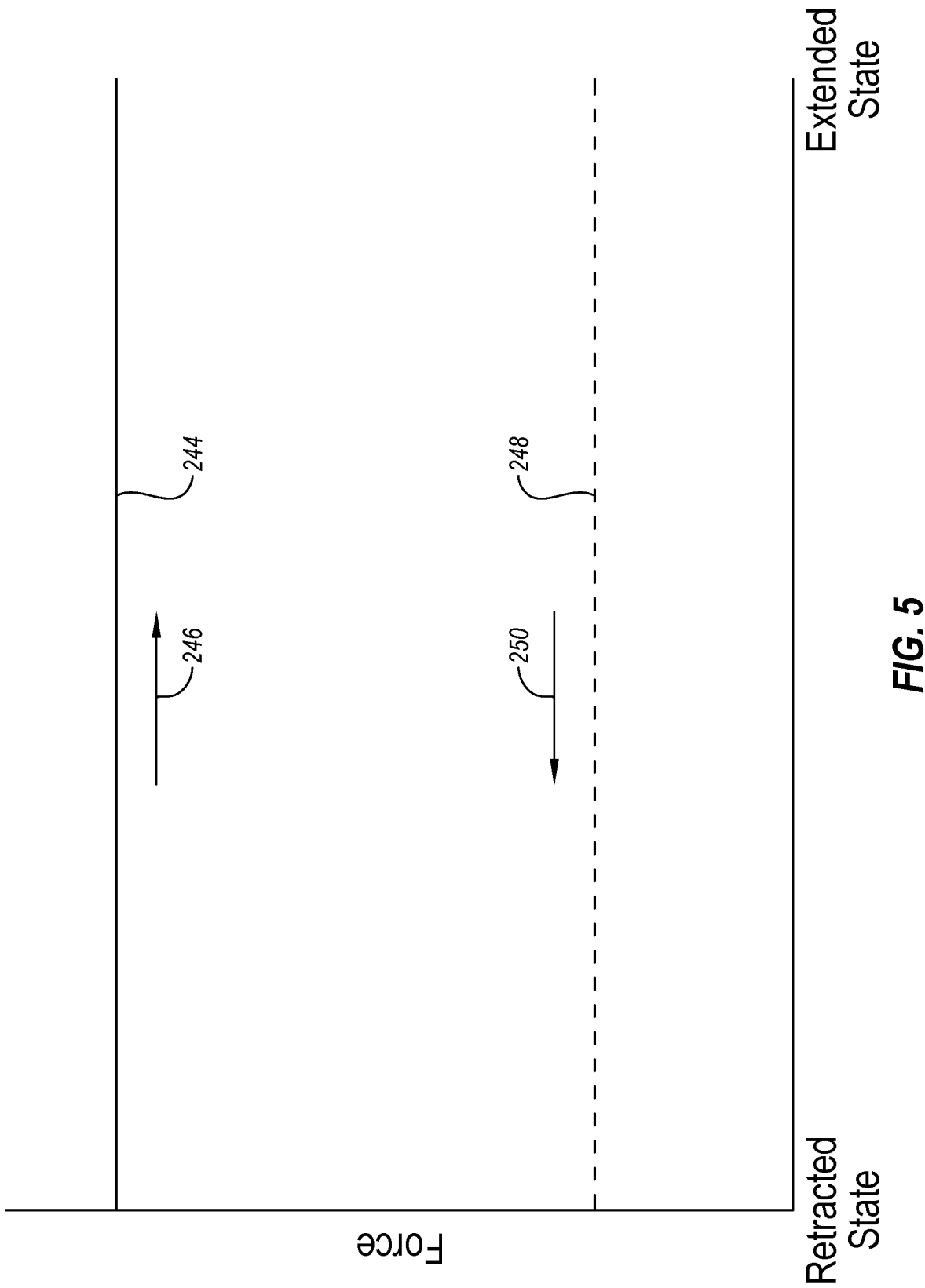
FIG. 5 is a graph illustrating the force applied by a linear actuator to incline a platform, according to at least one embodiment of the present disclosure.

In some embodiments, the linear actuator may produce an extension force to move a mass of a frame and/or a user against the force of gravity. The linear actuator may produce a lesser retraction force and efficiently move the mass of the frame and/or the user with the force of gravity. For example, a linear actuator may produce an extension force 244 represented by the upper curve of FIG. 5. The extension force 244 may be generated when moving the linear actuator in an extension direction 246 toward the extended state. A linear actuator may produce a retraction force 248 represented by the lower curve of FIG. 5. The retraction force 248 may be generated when moving the linear actuator in a retraction direction 250 toward the retracted state.

The linear actuator may have an efficiency ratio that is defined by the ratio between the extension force 244 and the retraction force 248. In some embodiments, the efficiency ratio may be substantially constant throughout the range of motion. In other embodiments, the efficiency ratio may change during movement between the retracted state and extended state.

In some embodiments, the efficiency ratio may be greater than 1.0. In other embodiments, the efficiency ratio may be between 1.0 and 10.0. For example, the extension force 244 may be 1000 pounds of force and the retraction force 248 may be at least 100 pounds of force. In yet other embodiments, the efficiency ratio may be between 1.0 and 5.0. For example, the extension force 244 may be 1000 pounds of force and the retraction force 248 may be at least 200 pounds of force. In further embodiments, the efficiency ratio may be between 1.0 and 4.0. For example, the extension force 244 may be 1000 pounds of force and the retraction force 248 may be at least 250 pounds of force. In yet further embodiments, the efficiency ratio may be between 1.0 and 2.0. For example, the extension force 244 may be 1000 pounds of force and the retraction force 248 may be at least 500 pounds of force.

It should be understood that a linear actuator may be oriented in a opposite direction to that described herein, with the linear actuator configured to move the mass of the frame and/or the user against the force of gravity while moving toward the retracted state. In other words, a linear actuator may "pull" the frame and/or user upward instead of "pushing" the frame and/or user upward. In such embodiments, the efficiency ratio may be inverted as the retraction force may be greater than the extension force.

Figure 6:
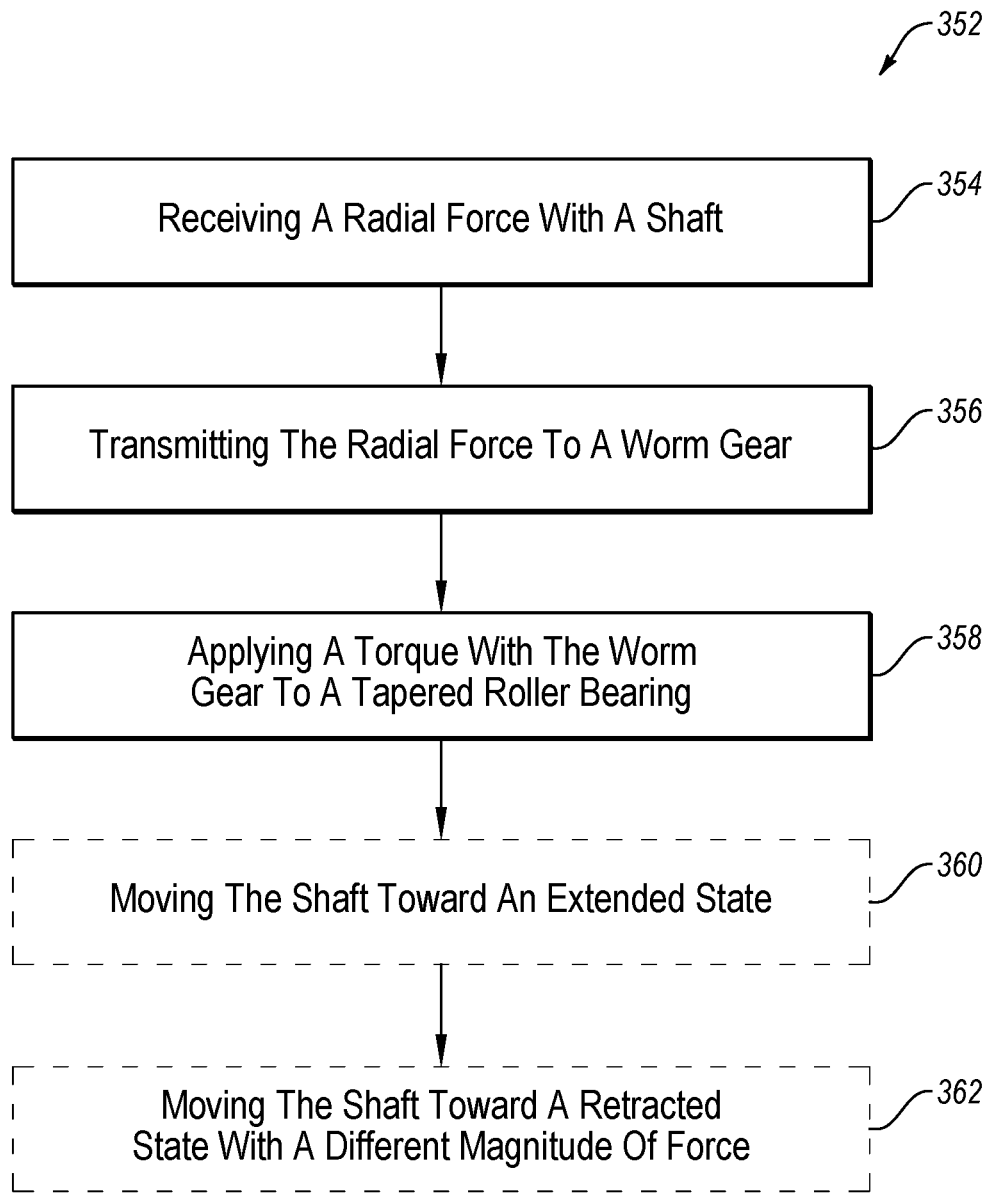
FIG. 6 is a flowchart illustrating a method of supporting a shaft in a linear actuator, according to at least one embodiment of the present disclosure.

FIG. 6 is a flowchart illustrating a method 352 of supporting a linear actuator. The method 352 includes receiving a radial force with a shaft at 354 and transmitting the radial force to an acme screw supporting the shaft at 356. The force transmitted to the acme screw may then apply a torque to the tapered roller bearing at 358. The tapered roller bearing may support the acme screw against the radial force while allowing the acme screw to rotate relative to the shaft. The method 352 may optionally include continuing to rotate the acme screw to move the shaft toward an extended state at 360 with an extension force. Further, the method 352 may optionally include moving the shaft toward a retracted state with a retraction force, where the retraction force has a different magnitude than the extension force at 362.

In some embodiments, a magnitude of the retraction force may be less than a magnitude of the extension force. For example, the magnitude of the retraction force may be less than half the magnitude of the extension force. In other examples, the magnitude of the retraction force may be less than one third of the magnitude of the extension force. In yet other examples, the magnitude of the retraction force may be less than one quarter of the magnitude of the extension force. In further examples, the magnitude of the retraction force may be less than one fifth of the extension of the retraction force.

INDUSTRIAL APPLICABILITY

In general, the present invention relates to supporting a shaft of a linear actuator during cross-loading or during the application of a radial force to the shaft. Conventional linear actuators include a thrust bearing or bushing in to support the shaft and/or an acme screw supporting the shaft. In applications that include a lateral or radial force applied to a shaft, a linear actuator is not typically used, as the typical operational lifetime of a linear actuator in such an application can be shortened.

In some embodiments according to the present disclosure, a linear actuator may include a tapered roller bearing supporting the shaft and/or supporting an acme screw that supports the shaft. The linear actuator may include a motor configured to move a shaft axially along a longitudinal axis of the shaft. The motor may be connected to the shaft through a casing and a sleeve. The casing may contain one or more gears, belts, cables, or other torque transmission devices to transfer torque from the motor to an acme screw in the sleeve. The acme screw may interact with a complementary surface feature on the shaft such that, upon rotation of the acme screw, the shaft moves in the direction of the longitudinal axis.

The acme screw may be driven by a linkage of gears positioned within the casing and driven by the motor. In other embodiments, the linkage from the motor to the acme screw may include belts, chains, cams, levers, or other mechanisms for transferring torque from the motor to the acme screw.

In some embodiments, the shaft may experience a force applied in a radial direction relative to the longitudinal axis (i.e., perpendicular to the longitudinal axis). A torque applied to the shaft by the radial force may be transmitted to the acme screw or other component of the linear actuator and to the connection between the acme screw or other component and the casing and/or gears. For example, the radial force may be incurred from the lateral impact of a user running on a treadmill on an exercise system. In other examples, the force may be incurred from a downward force applied by the weight of a user and/or a frame resting on the linear actuator when an exercise system is positioned with an inclination or declination.

A linear actuator includes a tapered roller bearing positioned between the shaft and the casing. In some embodiments, the tapered roller bearing may be positioned between at least a portion of the acme screw and the casing. For example, the tapered roller bearing may be positioned between a shoulder of the acme screw and the casing.

The radial force and/or an axial force on the shaft may be transmitted to the acme screw and to the tapered roller bearing. In some embodiments, the tapered roller bearing may have a bearing angle between the longitudinal axis and a bearing axis of the tapered roller bearing. The bearing angle may be in a range having an upper value, a lower value, or upper and lower values including any of 5°, 10°, 15°, 20°, 25°, 30°, 35°, 40°, 45°, or any values therebetween. In some examples, the bearing angle may be greater than 5°. In other examples, the bearing angle may be less than 45°. In yet other examples, the bearing angle may be between 5° and 45°. In further examples, the bearing angle may be between 5° and 30°. In yet further examples, the bearing angle may be about 10°. The bearing angle of the tapered roller bearing may affect the operational lifetime of the linear actuator by being oriented to receive more radial force relative to axial force on the acme screw or more axial force relative to radial force.

In some embodiments, a linear actuator may generate different forces in an extension direction and a retraction direction (i.e., "push" and "pull" directions). For example, the linear actuator may be configured to apply more force in the extension direction than in the retraction direction. In other examples, the linear actuator may be configured to apply more force in the retraction direction than in the extension direction. In some applications, the linear actuator may be raising one or more objects against gravity in one direction while the force of gravity may assist the movement of the objects in the opposite direction. A linear actuator may reduce or limit the heat generated and energy expended while moving the "assisted direction" by operating at a lower force generation and/or in a more efficient mode. The linear actuator may, therefore, have an efficiency ratio defined as the relative amount of force generated by the linear actuator in a first direction relative to a second direction.

In some embodiments, the efficiency ratio may be greater than 1.0. In other embodiments, the efficiency ratio may be between 1.0 and 10.0. For example, the extension force may be 1000 pounds of force and the retraction force may be at least 100 pounds of force. In yet other embodiments, the efficiency ratio may be between 1.0 and 5.0. For example, the extension force may be 1000 pounds of force and the retraction force may be at least 200 pounds of force. In further embodiments, the efficiency ratio may be between 1.0 and 4.0. For example, the extension force may be 1000 pounds of force and the retraction force may be at least 250 pounds of force. In yet further embodiments, the efficiency ratio may be between 1.0 and 2.0. For example, the extension force may be 1000 pounds of force and the retraction force may be at least 500 pounds of force.

Reducing friction through the tapered roller bearing and increasing efficiency to lessen heat generation may allow for a linear actuator to have an increased duty cycle compared to a conventional linear actuator. For example, a linear actuator according to the present disclosure may have a duty cycle of at least 50%, at least 75%, at least 85%, at least 95%, or a continuous duty cycle. In at least one example, a linear actuator according to the present disclosure may have a duty cycle of at least 70% for a 20 minute duration.

In some embodiments, a linear actuator according to the present disclosure may be employed in various exercise systems. For example, the linear actuator may be used to adjust an inclination or declination of a treadmill, an elliptical machine, an exercise bicycle, a rowing machine, a stepping machine, or other exercise machines that may be included in an exercise system. The linear actuator may be manually controlled by a user through a computing device or other interface (e.g., the user may select the inclination or declination themselves) in communication with the linear actuator, or a user may select an exercise routine on a computing device in communication with the linear actuator.

In some embodiments, the computing device may communicate with or access user profiles with exercise routines specific to the selected user. An example of a user profile database that may be compatible with the principles described herein includes the iFit program as described above. In some examples, the user information accessible through the user profiles includes the user's age, gender, body composition, height, weight, health conditions, other types of information, or combinations thereof that may be helpful in determining the appropriate exercise routine for the user. Such user profile information may be available to the computing device through the iFit program.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

By way of example, linear actuators according to the present disclosure may be described according to any of the following sections:

1. A linear actuator, the actuator comprising:
   a motor;
   a shaft having a longitudinal axis, the shaft moveable along the longitudinal axis by the motor;
   a casing supporting the motor and the shaft; and
   a tapered roller bearing positioned between the shaft and the casing.
2. The actuator of section 1, further comprising an acme screw positioned at least partially inside the shaft and rotatable around the longitudinal axis.
3. The actuator of section 2, further comprising a plurality of rotary gears positioned between and providing communication between the motor and the acme screw.
4. The actuator of section 2 or 3, the tapered roller bearing contacting a shoulder of the acme screw and the casing.
5. The actuator of any preceding section, the tapered roller bearing having a bearing axis between 5° and 45° from the longitudinal axis.
6. The actuator of any preceding section, the shaft having an extension direction and a retraction direction relative to the longitudinal axis, the motor having an extension rotational direction associated with the extension direction of the shaft and a retraction rotational direction associated with the retraction direction, where the motor generates more torque in the extension rotational direction than in the retraction rotational direction.
7. The actuator of any preceding section, the linear actuator generating at least twice as much force in a first longitudinal direction than in a second longitudinal direction.
8. An exercise system, the system comprising:
   a base;
   a frame moveably connected to the base;
   a linear actuator positioned between at least a portion of the base and at least a portion of the frame to apply a force to move the frame relative to the base, the linear actuator including:
      a motor,
      a shaft having a longitudinal axis, the shaft moveable along the longitudinal axis by the motor;
      a casing supporting the motor and the shaft; and
      a tapered roller bearing positioned between the shaft and the casing.
9. The exercise system of section 8, the frame being pivotally connected to the base.
10. The exercise system of section 8 or 9, the frame including a treadmill.
11. The exercise system of any of sections 8 through 10, further comprising a computing device in communication with the linear actuator.
12. The exercise system of section 11, the computing device having exercise routines stored thereon to actuate the linear actuator at predetermined intervals with a duty cycle of at least 40%.
13. The exercise system of any of sections 8 through 12, the frame having a range of motion relative to the base of at least 0° to at least 150°.
14. The exercise system of any of sections 8 through 13, the linear actuator generating at least 1000 pounds of force in the expansion direction.
15. The exercise system of any of sections 8 through 14, the longitudinal axis of the linear actuator being oriented at an angle at least 20° relative to the direction of gravity in the extended state.
16. A method of supporting a shaft of a linear actuator, the method comprising:
   receiving a radial force with a shaft of the linear actuator;
   transmitting the radial force to an acme screw; and
   applying a torque with the acme screw to a tapered roller bearing.
17. The method of section 16, further comprising moving the shaft toward an extended state with an extension force of at least 1000 pounds.
18. The method of section 17, further comprising moving the shaft toward a retracted state with a retraction force, wherein a magnitude of the retraction force is different from a magnitude of the extension force.
19. The method of section 18, the magnitude of the extension force is at least twice the magnitude of the retraction force.
20. The method of section 18 or 19, wherein moving the shaft toward an extended state and moving the shaft toward the retracted state results in at least a 70% duty cycle over a 20-minute duration.

What is claimed is:
1. A linear actuator, the actuator comprising:
   a motor;
   a shaft having a longitudinal axis, the shaft moveable along the longitudinal axis by the motor;
   a casing supporting the motor and the shaft; and
   a tapered roller bearing positioned between the shaft and the casing, wherein the tapered roller bearing is in contact with the shaft, wherein the tapered roller bearing includes:
      an inner race;
      an outer race; and
      a plurality of rollers positioned between the inner race and the outer race, wherein the plurality of rollers are positioned with a bearing angle relative to the longitudinal axis of the shaft, the bearing angle being between 5° and 45° to receive an axial force and a radial force applied to the shaft.
2. The actuator of claim 1, further comprising an acme screw positioned at least partially inside the shaft and rotatable around the longitudinal axis.
3. The actuator of claim 2, further comprising a plurality of rotary gears positioned between and providing communication between the motor and the acme screw.
4. The actuator of claim 2, the tapered roller bearing contacting a shoulder of the acme screw and the casing.
5. The actuator of claim 1, the shaft having an extension direction and a retraction direction relative to the longitudinal axis, the motor having an extension rotational direction associated with the extension direction of the shaft and a retraction rotational direction associated with the retraction direction, where the motor generates more torque in the extension rotational direction than in the retraction rotational direction.
6. The actuator of claim 1, the linear actuator generating at least twice as much force in a first longitudinal direction than in a second longitudinal direction.
7. An exercise system, the system comprising:
   a base;
   a frame moveably connected to the base;

a linear actuator positioned between at least a portion of the base and at least a portion of the frame to apply a force to move the frame relative to the base, the linear actuator including:
  a motor;
  a shaft having a longitudinal axis, the shaft moveable along the longitudinal axis by the motor;
  a casing supporting the motor and the shaft; and
  a tapered roller bearing positioned between a shoulder of the shaft and the casing, wherein the tapered roller bearing includes:
    an inner race;
    an outer race; and
    a plurality of rollers positioned between the inner race and the outer race, wherein the tapered roller includes a bearing angle of between 5° and 45° to receive an axial force and a radial force applied to the shaft.

8. The exercise system of claim 7, the frame being pivotally connected to the base.

9. The exercise system of claim 7, the frame including a treadmill.

10. The exercise system of claim 7, further comprising a computing device in communication with the linear actuator.

11. The exercise system of claim 10, the computing device having exercise routines stored thereon to actuate the linear actuator at predetermined intervals with a duty cycle of at least 40%.

12. The exercise system of claim 7, the frame having a range of motion relative to the base of at least 0° to at least 15°.

13. The exercise system of claim 7, the linear actuator generating at least 1000 pounds of force in an expansion direction.

14. The exercise system of claim 7, the longitudinal axis of the linear actuator being oriented at an angle at least 2° relative to a direction of gravity in an extended state.

15. A method of supporting a shaft of a linear actuator, the method comprising:
  receiving a radial force with a shaft of the linear actuator;
  transmitting the radial force to an acme screw; and
  applying a torque with the acme screw to a tapered roller bearing, the tapered roller bearing including an inner race, an outer race, and a plurality of rollers positioned between the inner race and the outer race with a bearing angle between 5° and 45°, wherein the tapered roller bearing receives at least a portion of the radial force and an axial force based on a contact with the shaft.

16. The method of claim 15, further comprising moving the shaft toward an extended state with an extension force of at least 1000 pounds.

17. The method of claim 16, further comprising moving the shaft toward a retracted state with a retraction force, wherein a magnitude of the retraction force is different from a magnitude of the extension force.

18. The method of claim 17, the magnitude of the extension force is at least twice the magnitude of the retraction force.

19. The method of claim 17, wherein moving the shaft toward an extended state and moving the shaft toward the retracted state results in at least a 70% duty cycle over a 20-minute duration.

* * * * *